United States Patent [19]

Palmer

[11] 4,102,132
[45] Jul. 25, 1978

[54] MOTOR CONTROL

[75] Inventor: Norman H. G. Palmer, Leicester, England

[73] Assignee: Towmotor Corporation, Mentor, Ohio

[21] Appl. No.: 815,118

[22] Filed: Jul. 13, 1977

[30] Foreign Application Priority Data

Mar. 22, 1977 [GB] United Kingdom ............... 12055/77

[51] Int. Cl.² ........................ F15B 11/02; F15B 11/16
[52] U.S. Cl. ........................................ 60/433; 60/484; 60/DIG. 2; 91/414
[58] Field of Search .................. 60/484, DIG. 2, 433; 91/414

[56] References Cited

U.S. PATENT DOCUMENTS

| 3,014,344 | 12/1961 | Arnot | 60/DIG. 2 |
| 3,875,747 | 4/1975 | Briggs | 60/420 |
| 3,962,871 | 6/1976 | Blaha et al. | 60/DIG. 2 |

FOREIGN PATENT DOCUMENTS

| 1,105,131 | 3/1968 | United Kingdom | 60/DIG. 2 |
| 1,217,879 | 12/1970 | United Kingdom | 60/DIG. 2 |
| 1,385,099 | 2/1975 | United Kingdom | 60/DIG. 2 |

*Primary Examiner*—Edgar W. Geoghegan
*Attorney, Agent, or Firm*—Phillips, Moore, Weissenberger, Lempio & Majestic

[57] ABSTRACT

An electronic control for hydraulic operation of forks on a lift truck wherein in the motor and pump speed can be matched to the particular flow requirements of each hydraulic ram and wherein a smoothly variable speed of the motor and pump is obtained for operation of the lift ram by the degree of manipulation of the lift lever.

24 Claims, 3 Drawing Figures

MOTOR CONTROL

BACKGROUND OF THE INVENTION

The present invention relates to a control for operation of an electrically powered lift truck.

Such lift trucks normally use hydraulically actuated rams to lift the fork carriage, to tilt the mast, and to operate a variety of attachments such as sideshifters, clamps, rotators and the like. The hydraulic system for the rams normally uses a single hydraulic pump of the fixed-displacement type driven by an electric motor using the truck battery as its power source.

The various hydraulic functions require widely differing rates of hydraulic fluid flow. The tilt and attachments require relatively low rates of flow, while the lift function requires a much higher flow rate. The tilt and attachment flow requirements have remained relatively constant over the years, whereas the lift speed has increased considerably over recent years, thus increasing the range of flow rate required for operation.

The motor and pump must, of course, be designed to supply the maximum flow required for the lift function. If the motor is connected directly across the battery, as is often the case, excess fluid flow is produced when the tilt and attachment rams are operated. The excess fluid flow has to be dumped back to the supply tank at a high relief pressure which represents a considerable waste of energy and which causes an undesirable heating of the fluid. A similar situation occurs when the lift is operated at less than full speed except that in this case the excess oil is passed back to the supply tank at system pressure.

Electronic controls have been developed for electric motors wherein the motor is connected to the battery through an electronic switch means, typically a thyristor in the form of a silicon-controlled rectifier. The switch means is repeatedly closed and opened, with the ratio of closed to open time being controllable to regulate the average voltage delivered to the motor from the battery so that the speed thereof can be controlled.

SUMMARY OF THE INVENTION

The present invention utilizes an electronic switch means to control the speed of the motor and pump, and therefore provide different rates of fluid flow in the hydraulic system of a lift truck. A signal is generated for each selected hydraulic function, the signal being used to control operation of the motor and pump so that the pump will produce the proper fluid flow for the selected function.

In more particular, a plurality of voltage dividers are provided, one for each hydraulic function. Selection of one function will cause the voltage output of one, and only one, voltage divider, namely the one associated with that function, to be applied to the motor control so that the proper speed is produced. Each voltage divider has a variable resistor therein and the voltage divider circuits are independent of each other so that the voltage outputs can be adjusted to match the motor and pump speed to the particular function that is selected.

Normally, the tilt and attachment functions can operate efficiently with constant flow at the appropriate rate. For such functions, fixedly adjustable variable resistors are used to provide constant flow at the rate required for the selected function. However, when the lift function is selected, it is desirable to have the lift speed vary in accordance with the degree of movement of the lift lever from neutral position. In order to provide such variable speed of operation, the variable resistor of the voltage divider for the lift function is coupled to the lift lever so that the pump speed can be smoothly varied as the lift lever is moved away from and back to neutral.

Other aspects of the invention are set forth in the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENT

Figure 1:
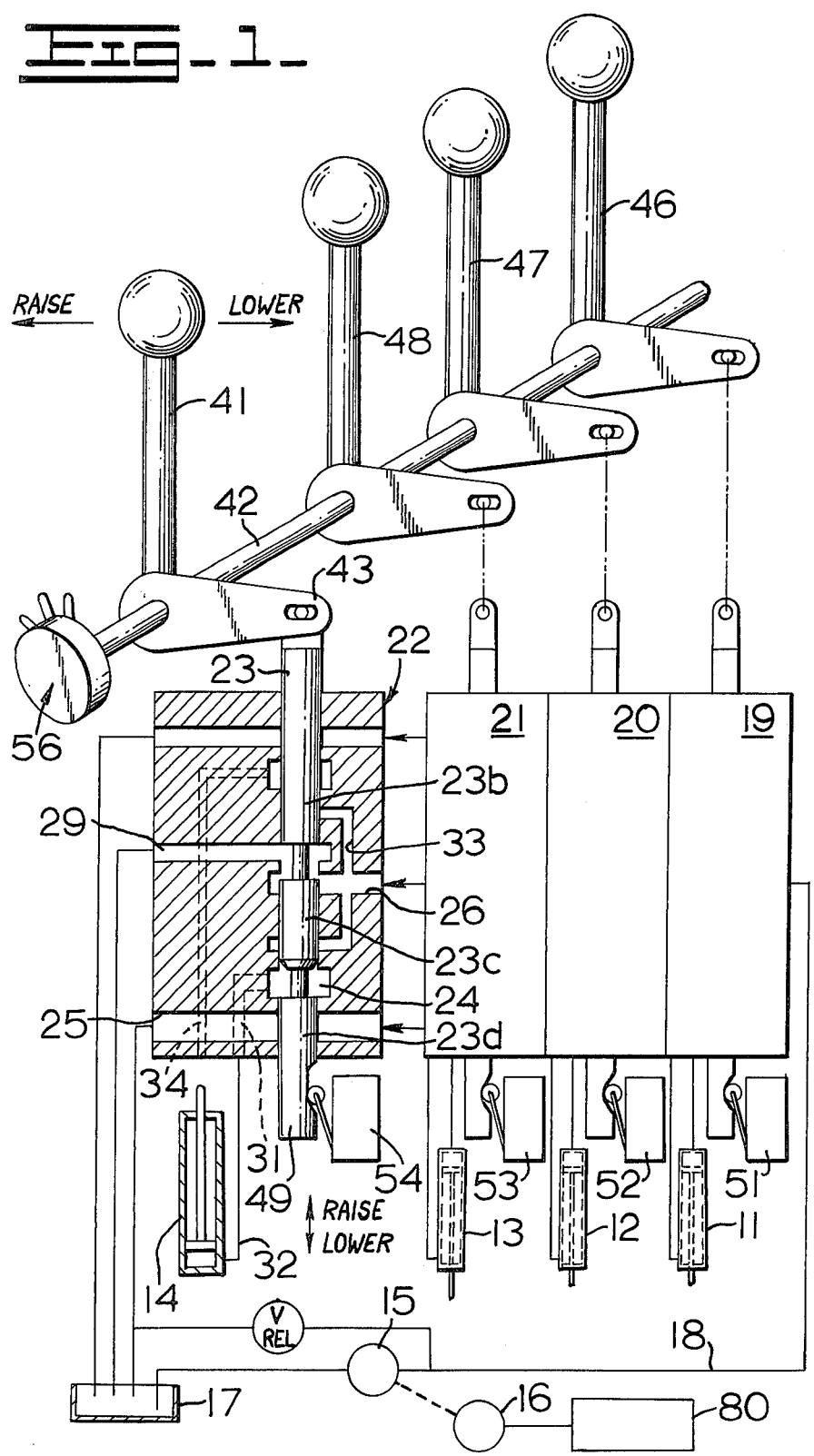
FIG. 1 is a generally schematic illustration of the invention.

Referring now to the drawings, wherein a preferred embodiment of the invention is shown, FIG. 1 discloses a system for moving the lift forks of a lift truck in a plurality of directions. Such system includes a plurality of hydraulically operable rams 11, 12, 13 and 14 which are mounted on the lift truck in a conventional manner to cause the forks to move as desired. For example, ram 14 is usable to lift the fork carriage while ram 13 is usable to tilt the mast. Rams 11 and 12 may be used for additional functions, such as side shifters, clamps, rotators or the like. Although four rams are shown, more or less may be used depending on the number of functions desired.

The hydraulic system for ram operation includes a pump 15, driven by electric motor 16, which draws hydraulic fluid from supply tank 17 and forces it under pressure through conduit 18 to the serially connected control valves 19, 20, 21 and 22 which are used to communicate the fluid to the various rams.

Valves 19–22 are conventional, and may be in the form generally shown in the drawing. Fluid under pressure enters inlet passage 26 and passes to the lands 23b and 23c of valve spool 23. If the spool is in the illustrated neutral position the fluid will flow out through outlet passage 29. Movement of the spool upwardly causes land 23c to block outlet 29 and open a chamber 24 to inlet 26 so that pressure fluid will flow through passage 31 and conduit 32 to the head end of ram 14. Ram 14 is a single acting device, thus there is no fluid connection between valve 22 and the rod end of the ram. Movement of the spool 23 downwardly permits the head end of ram 14 to exhaust via passage 31 past land 23d to outlet passage 25. Outlet 29 is blocked at this time by land 23b, but the pump does not run when spool 23 is in this position.

Valves 19–22 are identical and are connected so that the inlet passage 26 of each valve is connected to the outlet passage 29 of the preceding valve. In this manner whenever one of the valves is actuated to cause operation of the ram associated therewith, it will cut off pump pressure to the succeeding valves so that the succeeding rams will not operate even if their spools are moved from neutral with the exception of lift ram 14 which can permit lowering of the fork carriage by gravity when spool 23 is moved to the downward or lower position. Passages 33 and 34 are used when a control valve is required to establish fluid communication with both the head and rod ends of a ram such as 11, 12, 13 which are double acting in the arrangement of FIG. 1.

Movement of spool 23 is caused by a manually operable lever 41 which extends generally radially from support shaft 42 and is pivotal about the axis of such shaft. Link 43 connects between lever 41 and spool 23 for movement of the spool in either direction from neutral upon movement of the lever 41 from its illustrated neutral position. Valves 19, 20 and 21 are similarly operated by manually operable levers 46, 47 and 48.

Spool 23 includes a projection 49 that is profiled such that an associated microswitch 54 remains unoperated in the neutral and lower positions of the spool but is operated when the lever 41 is moved in the raise direction. The spools in valve sections 19, 20, 21 include similar projections profiled such that associated microswitches 51, 52, 53 remain unoperated in the neutral positions but will be operated when respective levers 46, 47 or 48 are moved in either direction from the neutral position. Lever 41, used to control operation of the lift ram 14, also actuates variable resistor 56 which is secured to support shaft 42 in a manner and for a purpose to be hereinafter described.

Figure 2:
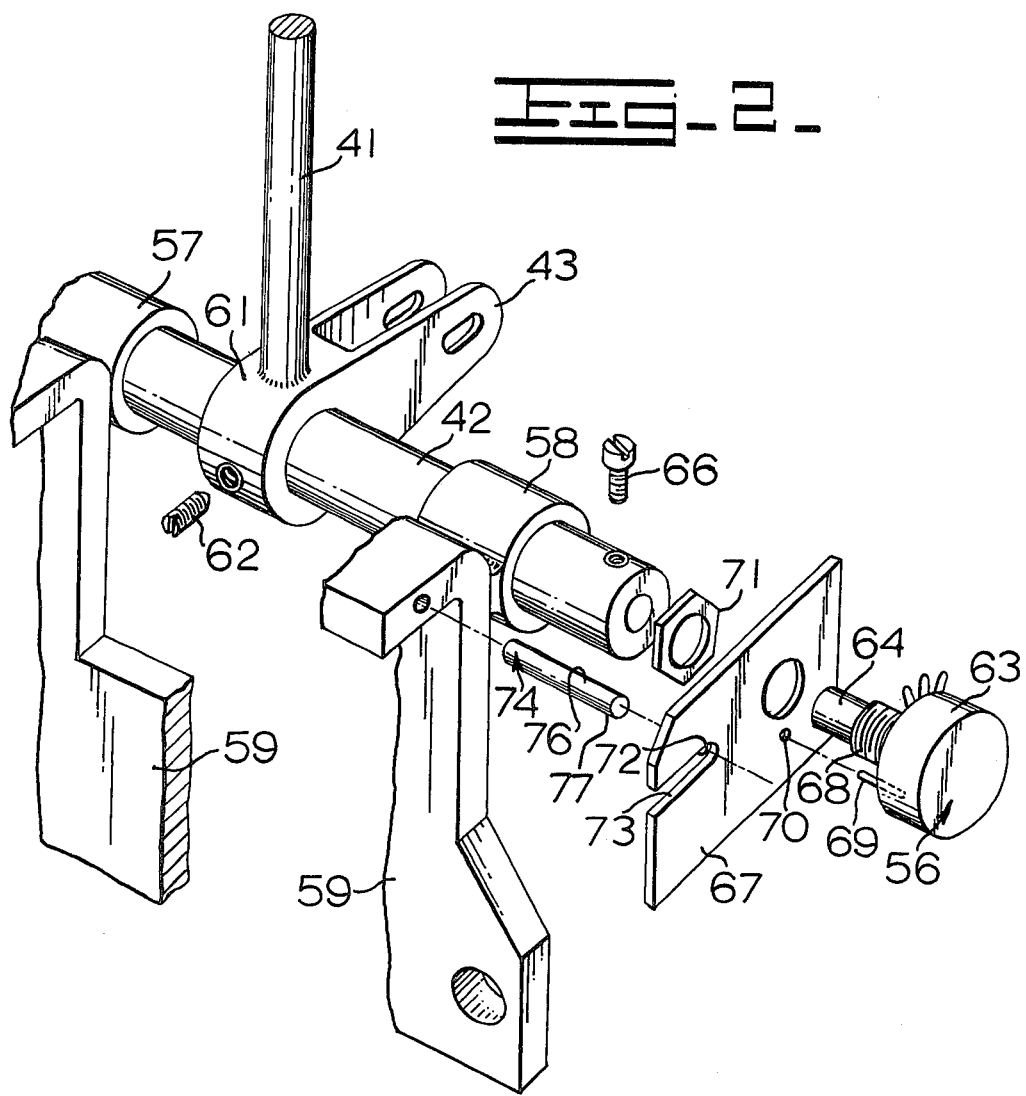
FIG. 2 is a perspective view of the lever and variable resistor mounting.

Referring now to FIG. 2, support shaft 42 is journaled in bearings 57 and 58 for rotation about its axis, the bearings being integral with frame bracket 59 which is rigidly securable to the frame of the lift truck. Lever 41 is mounted on shaft 42 by means of collar 61 which is secured to the shaft, as by set screw 62, so that pivotal movement of lever 41 causes rotation of shaft 42.

Variable resistor 56 includes a housing 63 and an axially extending rotatable adjustment shaft 64. The adjustment shaft fits within the bore of support shaft 42, coaxially therewith and is rigidly secured thereto by set screw 66 for unitary rotation. Plate 67 fits onto the threaded mount 68 of the resistor housing with housing prong 69 being received in hole 70 of plate 67 so that when nut 71 is screwed into place on the mount, plate 67 will be rigidly secured to the housing and held against rotary movement relative thereto. Plate 67 is slotted to provide opposed guide surfaces 72 and 73 spaced outwardly from the axis of shaft 64. A roll pin 74 is fixed to frame bracket 59 and extends parallel to the shafts 42 and 64, and through the slot of plate 67, pin 74 having guide surfaces 76 and 77 on opposite sides thereof which are in sliding engagement with guide surfaces 72 and 73 respectively of plate 67.

The interengagement of the pin 74 and plate 67 restrains any rotative movement of resistor housing 63 about the axis of its shaft 64. As a consequence, any rotation of shaft 42, by movement of lever 41, will cause a corresponding and accurate adjustment of the resistance of the resistor. In the event of endwise movement of shaft 42, which frequently occurs, the sliding interengagement of pin 74 and plate 67 will allow the resistor housing to move in a translatory manner with the shaft 42. As a result, endwise movement of shaft 42 places no strain on the resistor and does not affect its setting. In addition, this construction eliminates any possibility of side load on the potentiometer bearings which might otherwise occur due to eccentricity between shafts 42 and 64.

Levers 46, 47 and 48 may also be mounted on support shaft 42. However, their bearing collars are not clamped to the shaft, so that pivotal movement of these levers will not cause rotative movement of shaft 42 or vice versa.

Figure 3:
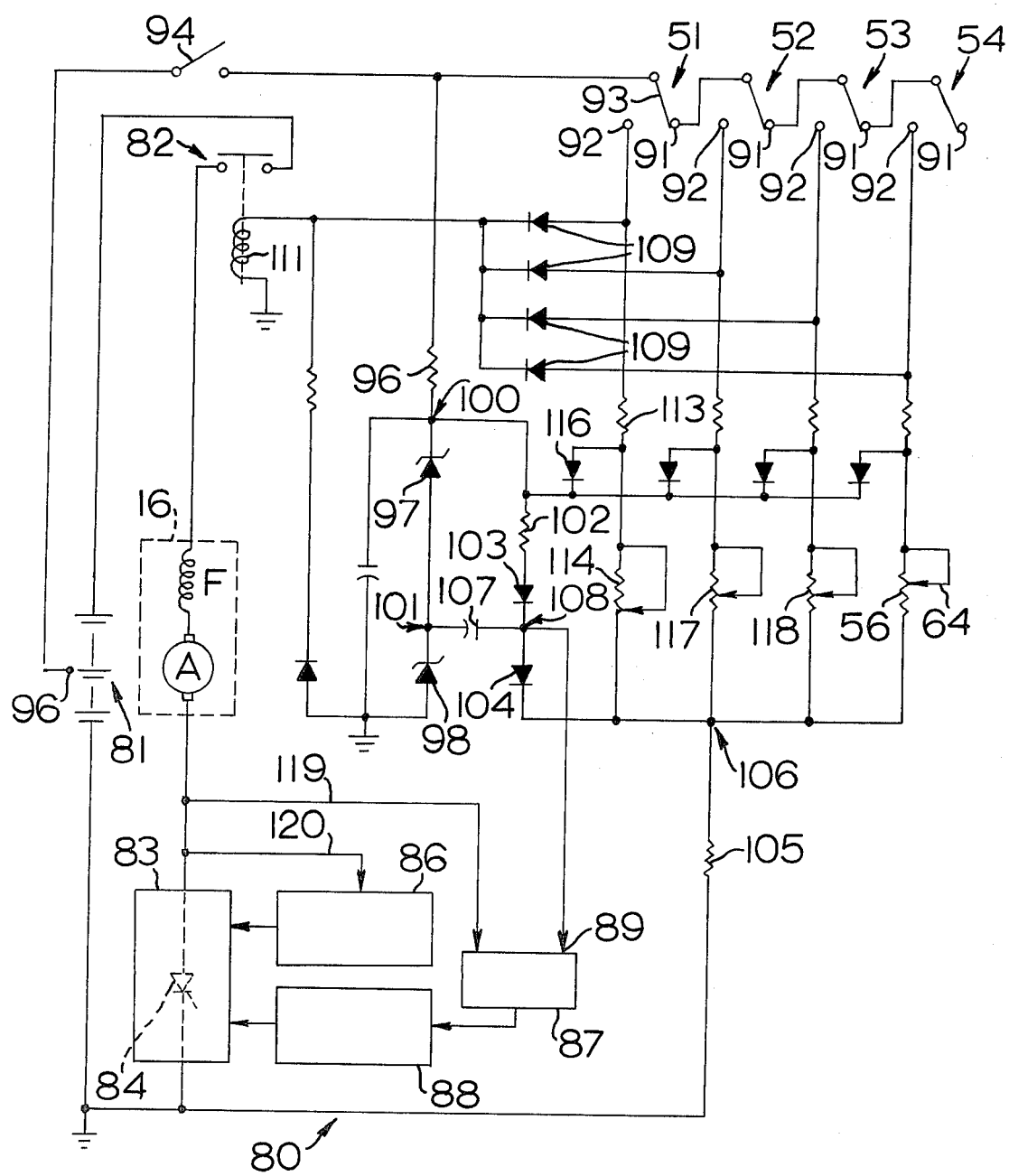
FIG. 3 is a diagram of the motor control of FIG. 1.

The motor control 80 of FIG. 1 is illustrated in greater detail in FIG. 3. The main power circuit includes, in series, battery 81, main contactor contacts 82, the field F and armature A of motor 16 and an electronic switch means 83 which closes and opens to control the average voltage applied to the motor and thereby control the speed of the motor. The switch means preferably comprises a thyristor 84 through which the motor current flows when the thyristor has been gated into conduction. The operation of the thyristor can be controlled in any conventional manner. As, for example, a fixed-frequency "on" oscillator 86 may be used to generate a gate pulse once for each cycle of oscillation, the gate pulse being applied to the gate of thyristor 84 to gate it into conduction. When thyristor 84 switches on, an inhibit signal supplied via conductor 119 will be removed and the "off" oscillator 88 will generate a commutating pulse at a predetermined time after the thyristor 84 switches on. The commutating pulse is used, in a conventional manner to commutate thyristor 84 and thereby disconnect motor 16 from the battery. In such a system motor control is achieved by using the signal-responsive time delay means 87 to vary the time delay between the firing and commutation in response to the magnitude of the control signal applied to the control input 89 of the time delay. In this manner the magnitude of the control signal will control the on/off ratio of thyristor conduction for each cycle of operation and will thereby control the average voltage applied to the motor.

If desired, motor voltage can also be controlled by using a variable frequency "on" oscillator and an "off" oscillator which pulses at a constant time after the gate pulse from the "on" oscillator. In such case, the "on" oscillator conventionally includes a signal-responsive circuit wherein the frequency of oscillation is varied in response to the magnitude of a control signal. The on/off ratio of conduction of the main thyristor for each cycle of oscillation will again be determined by the magnitude of the control signal.

Microswitches 51, 52, 53 and 54 are shown on FIG. 3 in their normal position, i.e., their position when the valve and lever associated therewith are in neutral position. Each microswitch has a normally-closed contact 91 and a normally open contact 92. Movement of a valve and lever from neutral position will cause the movable switch member 93 to disengage from contact 91 and close against contact 92. The switches are connected in series with each other and through key switch 94 to battery tap 96, which may be at 36 volts. Battery tap voltage is applied to the switch member 93 of microswitch 51 through the key switch 94 and is applied to the switch members 93 of succeeding switches 52, 53, 54 through the normally closed contact 91 of the preceding switch and the serial connection of the switches is in the same order as the serial connection of control valves 19-22. It should be noted that in the case of the lift lever 41, the movable switch member 93 will disengage from contact 91 and close against contact 92 only when lever 41 is moved in the lift direction. By virtue of this arrangement, closure of the normally-open contacts of any one switch will apply battery tap voltage to its contact 92, provided all of the normally-closed contacts of the preceding switches are still closed. Contrarily stated, opening of the normally-closed contacts of any one switch will prevent battery tap voltage from being applied to any succeeding switch.

Closure of key switch 94 will allow current flow through resistor 96 and zener diodes 97 and 98 so that regulated voltages, less than battery tap voltage and, for example, 11.2 and 5.6 volts, will appear at junctions 100 and 101. Current can flow from junction 100 through resistor 102, diodes 103 and 104 and resistor 105, producing a voltage at junction 106 of about 5 volts. The acceleration capacitor 107 will consequently be discharged at this time. The voltage at the junction 108 between diodes 103 and 104 controls the time delay. The 5-volt signal at junction 106 will establish a minimum on-off ratio of conduction of thyristor 84.

If one of the control valves is moved from its neutral position, e.g., valve 19, its microswitch 51 will apply battery tap voltage to its contact 92. Current may now flow through one of the isolation diodes 109 and contactor coil 111 to cause contacts 82 to close. Battery voltage is applied through conductor 120 to the "on" oscillator 86 to start it into operation.

Current also flows through resistor 113, variable resistor 114 and resistor 105. Diode 116 clamps the voltage across the voltage divider comprising resistors 114 and 105 to the 11.2 volts at junction 100. Variable resistor 114 may be fixedly adjusted so that the voltage at the junction 106 will be at any desired value between 5.6 and 11.2 volts. This signal is then applied to the signal-responsive means 87 via diode 104 so that the on-off ratio of conduction of thyristor 84 is increased to the value at which the motor 16 will drive pump 15 to supply ram 11 with hydraulic oil of the desired amount.

Acceleration capacitor 107 will charge through resistor 102 and will provide a gradual increase of the voltage at junction 108 as it rises to the value determined by the setting of variable resistor 114.

In like manner, if microswitch 52 is actuated in response to movement of valve 20 and lever 47 from neutral position, contactor coil 111 and the "on" oscillator will be energized and the voltage divider comprised of variable resistor 117 and common resistor 105 will have a regulated 11.2-volt potential clamped thereacross. This in turn will cause voltage-output junction 106 to go to a level determined by the setting of variable resistor 117, so that the motor will drive pump 15 at the proper speed to supply ram 12. Likewise, the adjustment of variable resistor 118 will determine the pump speed for supplying ram 13.

The same occurrence happens when valve 22 and lever 41 are moved from neutral position to actuate the lift ram 14. However, in this instance the variable resistor 56 forming part of the voltage divider circuit is not fixedly adjustable but instead is associated with valve 22 and handle 41 so that its resistance will vary in proportion to the magnitude of movement of valve 22 and lever 41 from neutral position. This enables the operator to control motor speed and pump flow by lever 41 with the speed and flow increasing smoothly as the lever is moved progressively further from neutral position.

The present system thus provides a simple control whereby the motor can be separately and independently set to operate at a predetermined speed for each function desired and wherein the pump speed can be smoothly and continuously varied by the operator when the lift ram is in operation. By the serial connection of the control valves and microswitches, if the operator moves two levers from neutral position at the same time, the most upstream valve will control as to which function will be performed and the microswitch associated with that valve will ensure that the motor and pump operate at the proper speed for that function.

The embodiments of the invention in which an exclusive property or privilege is claimed are defined as follows:

1. In a system for moving the lift forks of a lift truck in a plurality of directions, said system including a plurality of hydraulically operable means one for each direction of movement, a fluid pump, a valve for each hydraulically operable means, a manually-operable lever operatively associated with each of said valves for moving said valves from neutral to operative position, said valves being serially connected downstream of said pump for serial flow from said pump through all of said valves when all of said valves are in neutral position, each said valve being operable when in operative position to communicate pump flow therethrough to the hydraulically operable means associated therewith and to cut off pump flow to the valves downstream thereof, an electric motor drivingly connected to said pump, a battery and electronic switch means connected in series with said motor and battery, the improvement comprising:

(a) oscillator means for closing said electronic switch means on each cycle of operation of said oscillator means,
   (b) means for opening said electronic switch means after each closure thereof by said oscillator means,
   (c) signal-responsive means for setting the ratio of closed to open time of said electronic switch means during a cycle of operation of said oscillator means in proportion to the magnitude of a signal applied to said signal-responsive means,
   (d) signal-generating means for generating a plurality of signals of predeterminable magnitude, each of said signals being associated with a different one of said valves,
   (e) means responsive to movement of each of said valves from neutral to operative position for applying the signal associated with said valve to said signal-responsive means and for inhibiting the application to said signal-responsive means of a signal associated with any downstream valve,
   (f) said signal-generating means including means for continuously varying the magnitude of one of said signals in proportion to the magnitude of movement from neutral position of the valve associated with said signal.

2. In a system as set forth in claim 1, wherein said signal-generating means (d) includes means for fixedly adjusting the magnitude of each of the other of said signals independently of the magnitude of movement from neutral position of the valve associated therewith.

3. In a system as set forth in claim 1, wherein said signal-generator means (d) includes a plurality of voltage divider circuits, one for each signal, and each having a voltage division output, and wherein said means (e) includes means applying a voltage across one of said voltage divider circuits and applying the voltage division output thereof to said signal-responsive means when the valve associated with said signal is in its operative position and the valves upstream thereof are in neutral position.

4. In a system as set forth in claim 3, further including means for applying a regulated voltage less than battery voltage to said voltage divider circuits.

5. In a system as set forth in claim 3, wherein said means (f) includes a variable resistor having a movable adjustment member, said variable resistor being a part of one of said voltage divider circuits, and means operatively coupling said adjustment member to the valve associated therewith for movement of said adjustment member proportional to movement of said valve from neutral position.

6. In a system as set forth in claim 5, wherein the other of said voltage dividers each include a variable resistor as a component thereof, the adjustment of which is independent of movement of the valve associated therewith.

7. In a system as set forth in claim 3, wherein said means (f) comprises a variable resistor having a housing and a rotatable adjustment shaft extending therefrom, said variable resistor being a part of one of said voltage divider circuits, a frame member, a support shaft journaled on said frame for rotation about its axis, means fixedly mounting one of said manually-operable levers on said support shaft with said lever extending generally radially of said support shaft, means securing said adjustment shaft to said support shaft coaxially therewith for integral rotative movement thereof, means interengaging said frame member and said potentiometer housing for permitting translatory movement of said housing relative to said frame member and in a direction axially and radially of said shafts while restraining rotation of said housing about the axis of said shafts.

8. In a system as set forth in claim 1, wherein said signal-generator means (d) includes a plurality of selectable resistors one each for each signal, said selectable resistors each having one end connected together and a common resistor connected to the connected-together ends of said selectable resistors and wherein said means (e) includes means applying a voltage across one of said selectable resistors and said common resistor and applying the connection of said selectable resistor and said common resistor to said signal-responsive means when the valve associated with said selectable resistor is in its operative position and the valves upstream thereof are in neutral position.

9. In a system as set forth in claim 8, further including means for applying a regulated voltage less than battery voltage to said voltage divider circuits.

10. In a system as set forth in claim 8, wherein said means (f) includes a variable resistor having a movable adjustment member, said variable resistor being one of said selectable resistors, and means operatively coupling said adjustment member to the valve associated therewith for movement of said adjustment member proportional to movement of said valve from neutral position.

11. In a system as set forth in claim 10, wherein the other selectable resistors each include a variable resistor adjustable independently of movement of the valve associated therewith.

12. In a system as set forth in claim 10, wherein said means (f) comprises a variable resistor having a housing and a rotatable adjustment shaft extending therefrom, said variable resistor being one of said selectable resistors, a frame member, a support shaft journaled on said frame for rotation about its axis, means fixedly mounting one of said manually operable levers on said support shaft with said lever extending generally radially of said support shaft, means securing said adjustment shaft to said support shaft coaxially therewith for integral rotative movement thereof, means interengaging said frame member and said potentiometer housing for permitting translatory movement of said housing relative to said frame member and in a direction axially and radially of said shafts while restraining rotation of said housing about the axis of said shafts.

13. In a system as set forth in claim 1, wherein said means (e) includes a plurality of switches, each switch being operatively associated with one of said valves, each switch having normally-closed and normally-open contacts when the valve associated therewith is in neutral position, and means for opening and closing, respectively, said contacts when said valve is in operative position, said switches being connected in series with said battery and in the same order as the serial connection of said valves, with the contacts of each switch being connected to the battery through the normally-closed contacts of the preceding switches, and wherein said means (e) includes means connected to one of the normally-open contacts of each switch for applying the signal associated therewith to said signal-responsive means when said normally-open contacts are closed and the normally-closed contacts of the preceding switches are closed.

14. In a system as set forth in claim 1, wherein said signal-generator means (d) includes a plurality of voltage divider circuits, one for each signal, and each having a voltage division output, and wherein said means (e) includes a plurality of switches, each switch being operatively associated with one of said valves, each switch having normally-closed and normally-open contacts when the valve associated therewith is in neutral position, means for opening and closing said contacts, respectively, when said valve is in operative position, said switches being connected in series to said battery and in the same order as the serial connection of said valves, with the contacts of each switch being connected to said battery through the normally-closed contacts of the preceding switches, and wherein said means (e) includes means applying a voltage across one of said voltage divider circuits and applying the voltage division output thereof to said signal-responsive means when said normally-open contacts of the switch associated therewith are closed and the normally-closed contacts of the preceding switches are closed.

15. In a system as set forth in claim 14, further including means for applying a regulated voltage less than battery voltage to said voltage divider circuits.

16. In a system as set forth in claim 14 wherein said means (f) includes a variable resistor having a movable adjustment member, said variable resistor being a part of one of said voltage divider circuits, and means operatively coupling said adjustment member to the valve associated therewith for movement of said adjustment member proportional to movement of said valve from neutral position.

17. In a system as set forth in claim 16, wherein the other of said voltage dividers each include a variable resistor as a component thereof, the adjustment of which is independent of movement of the valve associated therewith.

18. In a system as set forth in claim 14, wherein the voltage divider circuits of means (d) comprise a plurality of selectable resistors, one each for each valve, said selectable resistors each having one end thereof connected together and a common resistor connected to the connected-together ends of said selectable resistors, the connection of said common resistor to said selectable resistors being the voltage division output of said voltage divider circuits.

19. In a system as set forth in claim 18, further including means for applying a regulated voltage less than battery voltage to said voltage divider circuits.

20. In a system as set forth in claim 18 wherein said means (f) includes a variable resistor having a movable adjustment member, said variable resistor being one of said selectable resistors, and means operatively coupling said adjustment member to the valve associated therewith for movement of said adjustment member proportional to movement of said valve from neutral position.

21. In a system as set forth in claim 20, wherein the other selectable resistors each include a variable resistor adjustable independently of movement of the valve associated therewith.

22. Apparatus of the character described comprising:
a frame member,
a support shaft journaled on said frame for rotation about its axis,
an operating lever extending radially from said shaft,
means fixing said lever to said shaft for integral movement therewith,
a potentiometer or variable resistor having a housing and a rotatable adjustment shaft extending therefrom,
means securing said adjustment shaft to said support shaft coaxially therewith for integral rotative movement thereof,
means interengaging said frame member and said potentiometer or variable resistor housing for permitting translatory movement of said housing relative to said frame member and in a direction axially and radially of said shafts while restraining rotation of said housing about the axis of said shafts.

23. Apparatus as set forth in claim 22, wherein said interengageable means comprises a first member fixed to said potentiometer housing and having guide surfaces parallel to and offset from the axis of said potentiometer shaft, and a second member fixed to said frame member and having elongated guide surfaces parallel to said potentiometer shaft, the guide surfaces of said first member being in sliding engagement with the guide surfaces of said second member.

24. Apparatus as set forth in claim 23, wherein said first member comprises a plate fixed to said potentiometer housing and extending outwardly from said potentiometer shaft, said plate having a slot the sides of which form guide surfaces, and wherein said second member comprises a pin the opposite sides of which form guide surfaces, said pin being disposed in said slot.

* * * * *